United States Patent
Kang et al.

(10) Patent No.: US 9,812,705 B2
(45) Date of Patent: Nov. 7, 2017

(54) NEGATIVE ELECTRODE ACTIVE MATERIAL FOR LITHIUM SECONDARY BATTERY AND LITHIUM SECONDARY BATTERY COMPRISING THE SAME

(71) Applicant: LG Chem, Ltd., Seoul (KR)

(72) Inventors: Yoon Ah Kang, Daejeon (KR); Je Young Kim, Daejeon (KR); Yong Ju Lee, Daejeon (KR); Jin Hyong Lim, Daejeon (KR); Hoon Jeong, Daejeon (KR); Ki Hwan Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/063,424

(22) Filed: Oct. 25, 2013

(65) Prior Publication Data
US 2014/0050981 A1 Feb. 20, 2014

Related U.S. Application Data

(63) Continuation of application No. PCT/KR2013/004644, filed on May 28, 2013.

(30) Foreign Application Priority Data

May 30, 2012 (KR) .................. 10-2012-0057627

(51) Int. Cl.
*H01M 4/36* (2006.01)
*H01M 4/134* (2010.01)
(Continued)

(52) U.S. Cl.
CPC ............ *H01M 4/366* (2013.01); *H01M 4/134* (2013.01); *H01M 4/386* (2013.01); *H01M 4/622* (2013.01);
(Continued)

(58) Field of Classification Search
CPC .......... H01M 10/052; H01M 10/0565; H01M 4/134; H01M 4/661; H01M 4/366; H01M 4/623; H01M 4/622; H01M 4/386
See application file for complete search history.

(56) References Cited

U.S. PATENT DOCUMENTS 5,538,814 A * 7/1996 Kamauchi et al. ........... 429/303
2004/0018430 A1 1/2004 Holman et al.
(Continued)

FOREIGN PATENT DOCUMENTS

| CN | 1933214 A | 3/2007 |
| CN | 101404330 A | 4/2009 |

(Continued)

OTHER PUBLICATIONS

International Search Report from PCT/KR2013/004647, dated Sep. 6, 2013.
(Continued)

*Primary Examiner* — Nicholas P D'Aniello
(74) *Attorney, Agent, or Firm* — Lerner, David, Littenberg, Krumholz & Mentlik, LLP

(57) ABSTRACT

Provided is a negative electrode active material comprising (a) a core including one or more non-carbon-based materials selected from the group consisting of silicon, nickel, germanium, and titanium, and (b) an organic polymer coating layer formed of a polymer compound having a content of a fluorine component of 50 wt % or more on a surface of the core.

12 Claims, 1 Drawing Sheet

(51) Int. Cl.
  *H01M 4/62* (2006.01)
  *H01M 4/38* (2006.01)
  *H01M 10/0525* (2010.01)

(52) U.S. Cl.
  CPC .............. *H01M 4/623* (2013.01); *H01M 4/38* (2013.01); *H01M 10/0525* (2013.01)

(56) References Cited

U.S. PATENT DOCUMENTS

| | | |
|---|---|---|
| 2004/0048160 A1 | 3/2004 | Omaru |
| 2005/0129838 A1 | 6/2005 | Naarmann et al. |
| 2005/0287440 A1 | 12/2005 | Chang et al. |
| 2006/0063073 A1* | 3/2006 | Kawashima et al. ......... 429/246 |
| 2007/0059600 A1 | 3/2007 | Kim et al. |
| 2007/0087268 A1 | 4/2007 | Kim et al. |
| 2008/0118834 A1 | 5/2008 | Yew et al. |
| 2008/0118840 A1 | 5/2008 | Yew et al. |
| 2008/0170982 A1 | 7/2008 | Zhang et al. |
| 2008/0193831 A1 | 8/2008 | Mah et al. |
| 2008/0280169 A1 | 11/2008 | Niu et al. |
| 2009/0087748 A1* | 4/2009 | Choi et al. ................. 429/231.5 |
| 2009/0111019 A1 | 4/2009 | Hirose et al. |
| 2009/0297945 A1 | 12/2009 | Hwang et al. |
| 2010/0035114 A1* | 2/2010 | Rigoglioso .................... 429/33 |
| 2010/0086849 A1 | 4/2010 | Mizuno et al. |
| 2010/0192364 A1 | 8/2010 | Suzuki et al. |
| 2010/0297502 A1 | 11/2010 | Zhu et al. |
| 2011/0027650 A1* | 2/2011 | Yamamoto ........... H01M 4/134 429/218.1 |
| 2012/0094181 A1 | 4/2012 | Kim et al. |
| 2012/0183852 A1 | 7/2012 | Kim et al. |

FOREIGN PATENT DOCUMENTS

| | | |
|---|---|---|
| CN | 102428763 A | 4/2012 |
| DE | 102010020647 A1 | 5/2011 |
| JP | H07235328 A | 9/1995 |
| JP | 2000048806 A | 2/2000 |
| JP | 2001006683 A | 1/2001 |
| JP | 2002042787 A | 2/2002 |
| JP | 2003123766 A | 4/2003 |
| JP | 2007287630 A | 11/2007 |
| JP | 2008004535 A | 1/2008 |
| JP | 2008006784 A | 1/2008 |
| JP | 2008130570 A | 6/2008 |
| JP | 2008-198610 A | 8/2008 |
| JP | 2010108945 A | 5/2010 |
| JP | 2010129363 A | 6/2010 |
| JP | 2011011928 A | 1/2011 |
| JP | 2011014298 A | 1/2011 |
| JP | 2011198710 A | 10/2011 |
| KR | 10-2001-0092193 A | 10/2001 |
| KR | 10-0327488 B1 | 3/2002 |
| KR | 20020070763 A | 9/2002 |
| KR | 20030061239 A | 7/2003 |
| KR | 10-2006-0047424 A | 5/2006 |
| KR | 10-2006-0087003 | 8/2006 |
| KR | 10-0646546 B1 | 11/2006 |
| KR | 10-0666822 | 1/2007 |
| KR | 10-2007-0030487 A | 3/2007 |
| KR | 10-2007-0041900 A | 4/2007 |
| KR | 10-0752058 B1 | 8/2007 |
| KR | 10-0759556 B1 | 9/2007 |
| KR | 10-0814880 B | 3/2008 |
| KR | 10-2008-0036261 A | 4/2008 |
| KR | 10-2008-0076527 A | 8/2008 |
| KR | 10-0853327 | 8/2008 |
| KR | 2009-0124157 A | 12/2009 |
| KR | 10-2010-0119305 A | 11/2010 |
| KR | 10-2010-0136073 A | 12/2010 |
| KR | 10-1098518 | 12/2011 |
| KR | 10-1120437 | 3/2012 |
| KR | 10-1140866 | 5/2012 |
| WO | 2010/135446 A1 | 11/2010 |

OTHER PUBLICATIONS

Search report from European Application No. 13796536.4, dated Feb. 11, 2015.
International Search Report from PCT/KR2013/004644, dated Sep. 6, 2013.
Taeseup Song et al., "Arrays of Sealed Silicon Nanotubes as Anodes for Lithium Ion Batteries," Nanno Letters, vol. 10, No. 5, May 12, 2010, pp. 1710-1716, XP055195500.
Extended Search Report from European Application No. 13797038.0, dated Jun. 22, 2015.
Office Action from Chinese Application No. 201380028876.0, dated Feb. 2, 2016.

* cited by examiner

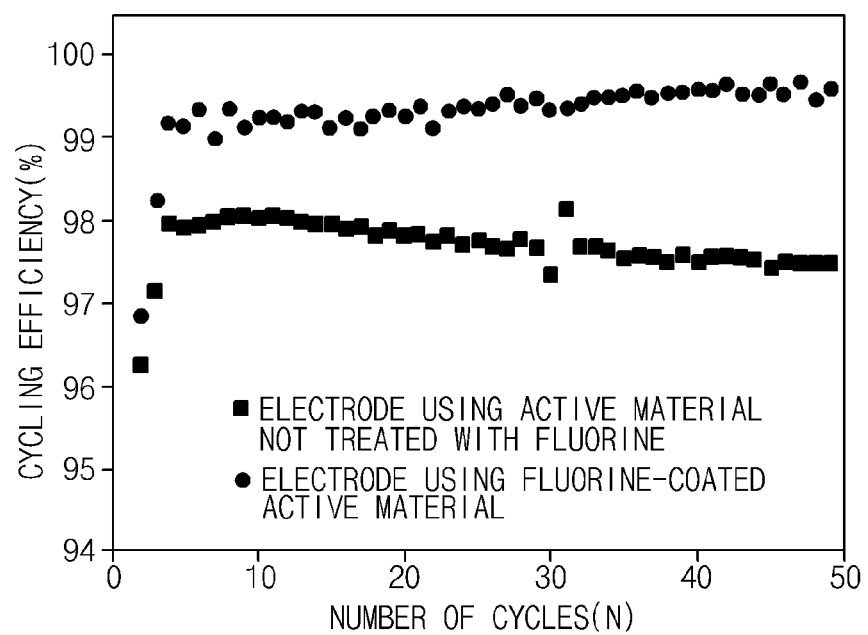

NEGATIVE ELECTRODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

This application is a continuation of International Application No. PCT/KR2013/004644 filed on May 28, 2013, which claims priority form Korean Patent Application No. 10-2012-0057627 filed with Korean Intellectual Property Office on May 30, 2012, the entire contents of which are incorporated herein by reference.

BACKGROUND OF THE INVENTION

Field of the Invention

The present invention relates to a negative electrode active material for a lithium secondary battery having excellent capacity characteristics and cycle lifetime, and a lithium secondary battery comprising the same.

Description of the Related Art

Recently, in line with realization of miniaturization and weight reduction of electronic apparatuses and generalization of the use of portable electronic devices, research into lithium secondary batteries having high energy density as power sources thereof has been actively conducted.

Lithium secondary batteries are prepared by charging an organic electrolyte or a polymer electrolyte between a positive electrode and a negative electrode, and generate electrical energy by a redox reaction occurred when lithium ions are intercalated and deintercalated between the positive electrode and the negative electrode.

Since an organic electrolyte is used in a secondary battery, the secondary battery exhibits high energy density in which a discharge voltage thereof is two times or more than that of a typical battery using an alkaline aqueous solution.

Lithium transition metal oxides such as $LiCoO_2$, $LiMn_2O_4$, and $LiNi_{1-x}Co_xO_2$ ($0<x<1$), in which intercalation of lithium ions is possible, are mainly used as a positive electrode active material of the lithium secondary battery. Also, a material, which may reversibly receive and supply lithium ions while maintaining structural and electrical properties, is used as a negative electrode active material of the lithium secondary battery. For example, lithium, metal containing lithium, or a carbon-based material, such as natural graphite and hard carbon, which is almost similar to lithium in which intercalation/deintercalation of lithium ions is possible, are mainly used. At this time, a battery using lithium or an alloy thereof as a negative electrode active material is referred to as a lithium metal battery and a battery using a carbon material as a negative electrode active material is referred to as a lithium-ion battery.

Meanwhile, since charge capacity of an electrode using a carbon-based negative electrode active material is low at 360 mAh/g (theoretical value: 372 mAh/g), there may be limitations in providing a lithium secondary battery having excellent capacity characteristics.

Accordingly, an inorganic material-based active material, such as silicon (Si), germanium (Ge), antimony (Sb), or titanium (Ti), which may store/release lithium (Li) by an alloying reaction with lithium, has been studied as a new material that may replace the carbon-based negative electrode active material.

The inorganic material-based active material, in particular, a silicon-based negative electrode active material may have a relatively large amount of bound lithium (theoretical maximum: $Li_{4.1}Si$) and this corresponds to a theoretical capacity of about 4200 mAh/g.

However, since the inorganic material-based negative electrode active material, such as silicon, may cause a large volume change during intercalation/deintercalation of lithium, i.e., charge and discharge of a battery, pulverization may occur. As a result, a phenomenon of agglomeration of pulverized particles may occur, and thus, the negative electrode active material may be electrically extracted from a current collector and this may cause loss of reversible capacity under a prolonged cycle. For example, a capacity of a lithium secondary battery using a silicon-based negative electrode active material may be similar to that of a battery using graphite after about 12 cycles. Therefore, a previously known inorganic material-based negative electrode active material, e.g., a silicon-based negative electrode active material, and a lithium secondary battery comprising the same may exhibit low cycle lifetime characteristics and capacity retention ratio despite of advantages according to their high charge capacity.

In order to address the foregoing limitations, there have been attempts to use a carbon and silicon-based nanoparticle composite as a negative electrode active material or use a negative electrode active material including carbon material and metal or semi-metal carbide coating layers (see Patent Document 1), a negative electrode active material including a coating layer including inorganic oxide particles on a surface of a core including lithium-vanadium-based oxide (see Patent Document 2), a negative electrode active material coated with a fluorine-based compound in the form of a complex salt (see Patent Document 3), and a negative electrode active material having an amorphous carbon layer formed on nanotubes containing a non-carbon-based material such as silicon. However, since the above negative electrode active materials may also exhibit a relatively large amount of loss of reversible capacity over a prolonged cycle, cycle lifetime characteristics and capacity retention ratio may not be sufficient. Also, capacity characteristics itself may not be sufficient due to the relatively large amount of carbon included in the nanocomposite.

PRIOR ART

Patent Literature (Patent Document 1) Korean Patent No. 10-0666822
(Patent Document 2) Korean Patent No. 10-0814880
(Patent Document 3) Korean Patent No. 10-0853327
(Patent Document 4) Korean Patent No. 10-1098518

SUMMARY OF THE INVENTION

The present invention provides a negative electrode active material for a lithium secondary battery capable of improving stability of an interface between a negative electrode and an electrolyte, and charge and discharge efficiency and lifetime characteristics of a battery.

The present invention also provides a lithium secondary battery comprising a negative electrode containing the negative electrode active material for a lithium secondary battery.

DETAILED DESCRIPTION OF THE PREFERRED EMBODIMENT

According to an aspect of the present invention, there is provided a negative electrode active material comprising:

(a) a core including one or more non-carbon-based materials selected from the group consisting of silicon, nickel, germanium, and titanium; and (b) an organic polymer coating layer formed on a surface of the core.

A polymer compound having a content of a fluorine component of 50 wt % or more, specifically, a content of a fluorine component ranging from 50 wt % to 95 wt %, in a total weight of a polymer may be used as the organic polymer coating layer of the present invention.

The polymer may be selected from the group consisting of (a) an epoxy compound containing a fluorine component, (b) an acrylate-based compound containing a fluorine component, and (c) a silane-based compound containing a fluorine component.

According to another aspect of the present invention, there is provided a lithium secondary battery comprising: (i) a positive electrode comprising a positive electrode active material, (ii) a negative electrode comprising the negative electrode active material of the present invention, (iii) a separator, and (iv) an electrolyte.

The lithium secondary battery may be a lithium metal secondary battery, a lithium ion secondary battery, a lithium polymer secondary battery, or a lithium ion polymer secondary battery.

A lithium secondary battery having high capacity and high efficiency may be prepared by using a negative electrode active material for a lithium secondary battery according to the present invention and a negative electrode for a lithium secondary battery comprising the negative electrode active material.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph in which charge and discharge efficiencies of lithium secondary batteries respectively comprising a negative electrode active material coated with a fluorine-containing polymer coating layer according to Experimental Example 1 of the present invention and a negative electrode active material not coated with a fluorine-containing polymer are compared.

DETAILED DESCRIPTION OF THE PREFERRED EMBODIMENT

The present invention will now be described more fully hereinafter with reference to the accompanying drawings, in which preferred embodiments of the invention are shown. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Accordingly, since the embodiments set forth in the present specification and the configurations illustrated in the drawings are shown by way of example and do not represent all the technological spirit of the present invention, it should be understood that embodiments of the present invention are capable of various modifications, equivalents, and alternatives at the time of present application.

According to an aspect of the present invention, there is provided a negative electrode active material comprising:

(a) a core including one or more non-carbon-based materials selected from the group consisting of silicon, nickel, germanium, and titanium; and (b) an organic polymer coating layer formed on a surface of the core.

The non-carbon-based material forming the core may be a single phase formed of silicon, nickel, germanium, or titanium, or an alloy phase thereof, and specifically, may be a single-phase silicon having a relatively large amount of bound lithium (theoretical maximum of silicon: $Li_{4.1}Si$).

Also, the non-carbon-based material may be in the form of a pipe or a tube having one end or both ends opened, which is surrounded by an outer wall including the above specific non-carbon-based material.

Specifically, the non-carbon-based material forming the core may be single-phase silicon or silicon nanotubes. At this time, since the single-phase silicon may facilitate a reversible electrochemical reaction in which the single-phase silicon forms an alloy with lithium during charging and releases lithium to return to the original single-phase silicon during discharging, battery capacity of the negative electrode active material for a lithium secondary battery of the present invention may be determined. Also, since changes in the volume of the entire negative electrode active material may not be large in the microstructured silicon nanotubes, an effect of improving cycle lifetime characteristics of the negative electrode active material may be obtained.

Thus, since the pulverization and electrical extraction due to the large changes in the volume of the active material during charge and discharge of the lithium secondary battery are significantly reduced, the negative electrode active material comprising the non-carbon-based material, specifically, single-phase silicon or silicon nanotubes, may exhibit better cycle characteristics and capacity retention ratio. Also, since the silicon nanotubes have a large area in contact with an electrolyte over inner and outer surfaces thereof according to its structural characteristics, intercalation and deintercalation of lithium may actively occur over the large surface area.

The organic polymer coating layer may be comprised a polymer hydrocarbon-compound having the entirety or a portion of hydrogen atom substituted with fluorine, example a fluorine-containing polymer compound.

A polymer compound comprising a content of a fluorine component of 50 wt % or more, specifically, a content of a fluorine component ranging from 50 wt % to 95 wt %, in a total weight of a polymer may be used as the organic polymer coating layer of the present invention. In the case where the content of the fluorine component in the organic polymer coating layer is less than 50 wt %, an effect of reacting with the electrolyte due to the fluorine component is insignificant.

The fluorine-containing polymer compound may be selected from the group consisting of (a) an epoxy compound containing a fluorine component, (b) an acrylate-based compound containing a fluorine component, and (c) a silane-based compound containing a fluorine component.

More particularly, an example of (a) the epoxy compound containing a fluorine component may be hexafluoro-1,2-epoxypropane expressed as the following Chemical Formula 1.

[Chemical Formula 1]

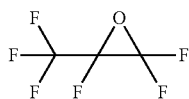

An example of (b) the acrylate-based compound containing a fluorine component may be an acrylate compound expressed as the following Chemical Formula 2, and more particular examples thereof may be 2,2,2-trifluoroethyl methacrylate, 2-(perfluorohexyl)ethyl methacrylate, 2-(perfluorooctyl)ethyl methacrylate, 2-(perfluorodecyl)ethyl methacrylate, and 2-(perfluorooctyl)ethyl acrylate.

[Chemical Formula 2]

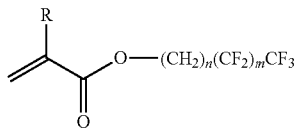

where R is a hydrogen or an alkyl group having carbon number of 1 to 2, and n is an integer of 1 or 2, and m is 0 or an integer between 1 and 12.

Also, an example of (c) the silane-based compound containing a fluorine component may be a compound expressed as the following Chemical Formula 3, and more particular examples thereof may be trichloro(1H,1H,2H,2H-perfluorooctyl)silane or perfluorodecyltrichlorosilane.

$$CF_3-(CF_2)_o(CH_2)_p-SiCl_3$$ [Chemical Formula 3]

where o is an integer between 1 and 12, and p is an integer of 1 or 2.

The organic polymer coating layer may be configured in the form of a single layer or a multilayer, and a thickness thereof is not particularly limited within a range of increasing capacity and efficiency of the battery. However, the thickness of the organic polymer coating layer may be 100 nm or less and for example, may be in a range of 50 nm to 100 nm. In the case that the thickness thereof is less than 50 nm or less, an effect targeted by coating the organic polymer coating layer may not be obtained. In the case that the thickness thereof is greater than 100 nm, performance of the battery is rather decreased because a thick solid electrolyte interface (SEI) layer is formed as an amount of the organic polymer participating in forming the SEI layer increases.

The negative electrode active material for a lithium secondary battery having the foregoing configuration according to an embodiment of the present invention may be prepared by coating the surface of the core including one or more non-carbon-based materials selected from the group consisting of silicon, nickel, germanium, and titanium with an organic polymer using a typical chemical vapor deposition method known in the art or a method.

The coating method may be a solvent evaporation method, a coprecipitation method, a precipitation method, a sol-gel method, an adsorption filtration method, or sputtering, as a non-restrictive example.

Specifically, an organic polymer material containing fluorine, such as hexafluoro-1,2-epoxypropane, is deposited on the surface of the core comprising a non-carbon-based material by hot wire chemical vapor deposition (HW CVD) method while heating a nickel wire (Ni/Cr=80/20) to 650° C. and flowing hexafluoropropylene oxide (HFPO) as a source gas at 50 sccm in the state of maintaining a process pressure of 0.5 torr.

At this time, in order for: $CF_3$ radicals separated due to the heat of the wire to be easily deposited on the surface of the core, a process of cooling by including cooling water under core samples is performed together during performing a deposition process. Furthermore, the core comprising a non-carbon-based material is introduced into a sample holder so as to allow an organic polymer layer containing fluorine to be uniformly deposited on the entire surface of the core and the deposition may be repeated three times or six times in such a manner that the core comprising a non-carbon-based material is mixed after 30 minutes of deposition and is then again deposited.

At this time, the supply source of hexafluoroethylene oxide may be provided at a rate ranging from 15 sccm to 100 sccm, and specifically, may be provided at a rate of 50 sccm during performing the above method. The process pressure may be maintained at 1 torr or less, and specifically, about 0.5 torr, and the temperature of heating the wire may be maintained in a range of 550° C. to 700° C., and specifically, may be maintained at about 650° C. In the case that the flow of the source and the process pressure are less than the above ranges, time for depositing a thin film may increase. In the case that the temperature of heating the wire is 500° C. or less, an organic polymer coating layer having a uniform thickness may not be formed due to a decrease in the uniformity of the thin film, and thus, electrochemical performance of the battery may be degraded. Also, in the case that the flow of the source and the temperature of heating the wire are greater than the above ranges, since a size of particles in the coating layer may increase as a binding rate of the fluorine component bound to the surface of the core is increased, an organic polymer coating layer having a uniform thickness may not be formed, and thus, the electrochemical performance of the battery may be degraded.

Meanwhile, the SEI layer is formed by reacting a surface of the negative electrode active material with the electrolyte during a first charge and discharge generated when lithium ions reciprocate the positive electrode and the negative electrode. The SEI layer performs a function of an ion tunnel to pass only lithium ions, and thus, prevents side reactions of the lithium ions with the negative electrode again or other materials. That is, since additional decomposition of the electrolyte is prevented to reversibly maintain the amount of the lithium ions in the electrolyte when the SEI layer is formed, stable charge and discharge may be maintained, and thus, lifetime characteristics of the battery may be improved.

However, since a predetermined amount of lithium is consumed when the SEI layer is formed, the amount of reversible lithium is decreased, and eventually, capacity of the battery may be decreased. In particular, in the case that irreversible capacity of the negative electrode is high in a current secondary battery system having a lithium source included in a positive electrode, a dead volume may be generated in the positive electrode through irreversibility of the negative electrode. Therefore, it may cause a decrease in the capacity of the battery in comparison to a capacity which may be actually used in the positive electrode.

Furthermore, with respect to a typical secondary battery using a carbon material as a negative active material, since a negative electrode thereof is exposed while durability of a SEI layer is gradually decreased according to the time elapsed during being stored at a high temperature in a fully charged state and gases, such as CO, $CO_2$, and $CH_4$, are generated as a surface of the negative electrode thus exposed reacts with a surrounding electrolyte to continuously generate a side reaction, an increase in the internal pressure of the battery may not only occur, but a decrease in charge capacity due to the side reaction with the electrolyte and a decrease in cycle lifetime due to the generation of irreversible capacity in an initial chare and discharge cycle may also occur.

In the present invention, since the stable fluorine-containing organic polymer coating layer having minimized reactivity with lithium is formed on the surface of the core comprising a non-carbon-based material to facilitate the formation of the SEI layer by a reaction between lithium ions and fluorine during initial charge and discharge, a negative electrode active material, in which the side reaction with respect to the electrolyte is reduced, may not only be provided, but the amount of reversible lithium required for the formation of the SEI layer on the surface of the negative electrode during charge and discharge of the battery may also be minimized. Therefore, a battery having high capacity and high efficiency may be realized by improving reversible efficiency and lifetime characteristics according to the charge and discharge cycles of the battery.

Actually, as a result of identifying charge and discharge efficiency of a secondary battery using the negative electrode active material having coating layer of the present invention formed thereon, it may be confirmed that the secondary battery of the present invention has an initial charge and discharge efficiency of about 89% or more.

Furthermore, since the negative electrode active material coated with the fluorine-containing organic polymer coating layer may have higher polarity in comparison to a basic negative electrode active material, better wettability may be obtained when a carbonate-based electrolyte formed of a polar solvent is used, and as a result, lithium may be rapidly transferred to improve the characteristics of the battery.

According to another aspect of the present invention, there is provided a lithium secondary battery comprising: (i) a positive electrode comprising a positive electrode active material, (ii) a negative electrode comprising the negative electrode active material of the present invention, (iii) a separator, and (iv) an electrolyte.

The lithium secondary battery may be a lithium metal secondary battery, a lithium ion secondary battery, a lithium polymer secondary battery, or a lithium ion polymer secondary battery.

(i) A positive electrode active material composition is prepared by mixing a positive electrode active material, a binder, and a solvent, and the positive electrode may then be prepared by directly coating an aluminum current collector with the positive electrode active material composition or may be prepared by casting the positive electrode active material composition on a separate support and laminating a positive electrode active material film detached from the support on an aluminum current collector.

At this time, a material, which may intercalate/deintercalate lithium, may be used as the positive electrode active material, and specifically, metal oxide, lithium composite metal oxide, lithium composite metal sulfide, and lithium composite metal nitride may be used. More particularly, a lithium intercalation material, such as lithium manganese oxide, lithium cobalt oxide, lithium nickel oxide, or lithium iron oxide, e.g., $LiCoO_2$, $LiNiO_2$, $LiClO_4$, $LiCF_3SO_3$, $LiPF_6$, $LiBF_4$, $LiAsF_6$, $LiN(CF_3SO_2)_2$, or $LiMn_2O_4$, or a composite oxide formed by a combination thereof may be used. However, the positive electrode active material is not limited thereto.

(ii) The negative electrode may be prepared by directly coating a current collector with the negative electrode active material of the present invention and drying, or may be prepared by casting a composition including the negative electrode active material of the present invention, a binder, and a solvent on a separate support and laminating a film detached from the support on a current collector, similar to the positive electrode.

Vinylidene fluoride/hexafluoropropylene copolymer, polyvinylidenefluoride, polyacrylonitrile, polymethylmethacrylate, polytetrafluoroethylene, and a mixture thereof may be used as the binder. However, the binder is not limited thereto.

Any metal having high conductivity easily adhered to pastes of the foregoing materials may be used as metallic materials for current collectors for preparing the negative electrode and the positive electrode without limitation. Non-restrictive examples of the positive electrode collector may be aluminum, nickel, or a foil prepared by a combination thereof, and non-restrictive examples of the negative electrode collector may be copper, gold, nickel, a copper alloy, or a foil prepared by a combination thereof.

Small amounts of a conductive agent, a binder, and/or a dispersion medium may be selectively added to the negative electrode active material composition and the positive electrode active material composition. Any electrically conductive material that does not generate chemical changes in the battery may be used as the conductive agent. For example, carbon black, such as acetylene black, Ketjen black, furnace black, and thermal black, natural graphite, artificial graphite, and metal powder may be used. Any one of a thermoplastic resin and a thermosetting resin may be used as the binder and a combination thereof may also be used. Among these resins, polyvinylidenefluoride (PVDF) or polytetrafluoroethylene (PTFE) may be used. Also, isopropyl alcohol, N-methylpyrrolidone (NMP), and acetone may be used as the dispersion medium. Contents of the conductive agent, the binder, and the solvent may be used at levels typically used in lithium secondary batteries.

Any material which may act to prevent an inner short circuit between both electrodes and impregnate an electrolyte in the lithium secondary battery may be used as (iii) the separator. As a particular example of the separator, polyethylene, polypropylene, a polyolefin-based porous separator, polyvinylidenefluoride, or a multilayer thereof having two or more layers may be used, and a mixed multilayer, such as a double-layered separator of polyethylene/polypropylene, a triple-layered separator of polyethylene/polypropylene/polyethylene, and a triple-layered separator of polypropylene/polyethylene/polypropylene, may be used.

A non-aqueous electrolyte or a known solid electrolyte may be used as (iv) the electrolyte charged into the lithium secondary battery, and an electrolyte having a lithium salt dissolved therein may be used.

Examples of the usable non-aqueous electrolyte in the present invention may be cyclic carbonate such as ethylene carbonate, diethyl carbonate, propylene carbonate, butylene carbonate, and vinylene carbonate; chain carbonate such as dimethyl carbonate, methylethyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitrile such as acetonitrile; and amides such as dimethylformamide. However, the non-aqueous electrolyte is not limited thereto. These materials may be used alone or in combination thereof. In particular, a mixed solvent of the cyclic carbonate and the chain carbonate may be used. Also, a gel polymer electrolyte, in which an electrolyte is impregnated with a polymer electrolyte solution such as polyethylene oxide and polyacrylonitrile, or an inorganic solid electrolyte, such as LiI and $Li_3N$, may be used. However, the electrolyte is not limited thereto.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlO_2$, $LiAlCl_4$, LiCl, and LiI. However, the lithium salt is not limited thereto.

A typical method known in the art may be used as a method of preparing the lithium secondary battery of the present invention, and as an exemplary embodiment, a lithium secondary battery may be prepared by injecting the non-aqueous electrolyte after assembling the positive electrode and the negative electrode having the separator included therebetween.

There may be no limitations in appearance of the lithium secondary battery prepared by the above method. However, a cylindrical can type, prismatic type, or pouch type lithium secondary battery may be used.

MODE FOR CARRYING OUT THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

EXAMPLES

Example 1: Negative Electrode Active Material (1) Preparation

A negative electrode active material (1), in which a surface of a nickel wire core was coated with 50 nm thick hexafluoro-1,2-epoxypropane, was prepared by hot wire chemical vapor deposition (HW CVD) while heating a wire (Ni/Cr=80/20) to 650° C. and flowing hexafluoropropylene oxide (HFPO) at 50 sccm in the state of maintaining a process pressure of 0.5 torr. At this time, cooling under the core sample was performed using cooling water during performing the deposition process.

Example 2: Negative Electrode Active Material (2) Preparation

A negative electrode active material (2) was prepared in the same manner as Example 1 except that 2,2,2-trifluoroethyl methacrylate was used instead of hexafluoro-1,2-epoxypropane.

Example 3: Negative Electrode Active Material (3) Preparation

A negative electrode active material (3) was prepared in the same manner as Example 1 except that 2-(perfluorohexyl)ethyl methacrylate was used instead of hexafluoro-1,2-epoxypropane.

Example 4: Negative Electrode (1) Preparation

A negative electrode active material slurry was prepared by mixing the negative electrode active material (1) prepared in Example 1 and a carbon black conductive agent in a N-methylpyrrolidone solution in which a polyvinylidenefluoride binder is dissolved. A 12 μm thick copper current collector was coated with the prepared negative electrode active material slurry by using a doctor blade method and N-methyl-2-pyrrolidone was evaporated by drying at 120° C. for 10 hours in a vacuum atmosphere. Then, a negative electrode (1) of the present invention was prepared by rolling.

Example 5: Negative Electrode (2) Preparation

A negative electrode (2) of the present invention was prepared in the same manner as Example 4 except that the negative electrode active material (2) of Example 2 was used instead of the negative electrode active material (1) of Example 1.

Example 6: Negative Electrode (3) Preparation

A negative electrode (3) of the present invention was prepared in the same manner as Example 4 except that the negative electrode active material (3) of Example 3 was used instead of the negative electrode active material (1) of Example 1.

Example 7: Secondary Battery (1) Preparation

A lithium cobalt oxide ($LiCoO_2$) positive electrode active material and a carbon black conductive agent were mixed to prepare a mixture. A polyvinylidenefluoride binder was dissolved in a N-methyl-2-pyrrolidone solvent to prepare a binder solution and the mixture was added to the binder solution to prepare a positive electrode active material slurry. A 20 μm thick aluminum foil was coated with the prepared positive electrode active material slurry by using a doctor blade method and N-methyl-2-pyrrolidone was evaporated by drying at 120° C. for 10 hours in a vacuum atmosphere. Then, a positive electrode was prepared by rolling.

A lithium secondary battery (1) was prepared according to a typical method by using the prepared positive electrode, the negative electrode (1) of Example 4, and 1M $LiPF_6$/ethylene carbonate (EC):ethylmethyl carbonate (EMC) (volume ratio 1:1) as an electrolyte.

Example 8: Secondary Battery (2) Preparation

A secondary battery (2) of the present invention was prepared in the same manner as Example 7 except that the negative electrode of Example 5 was used instead of the negative electrode of Example 4.

Example 9: Secondary Battery (3) Preparation

A secondary battery (3) of the present invention was prepared in the same manner as Example 7 except that the negative electrode of Example 6 was used instead of the negative electrode of Example 4.

Comparative Example 1

A negative electrode and a secondary battery were respectively prepared in the same manner as Examples 4 and 7 except that silica not coated with an organic polymer was used as a negative electrode active material.

EXPERIMENTAL EXAMPLE

Experimental Example 1: Performance Evaluation of Secondary Battery

Performance evaluations of the secondary battery (1) prepared in Example 7 of the present invention and the secondary battery of Comparative Example 1 were conducted as follows.

Charge and discharge efficiency of each battery was measured in a charge and discharge region ranging from 0.005 V to 2.0 V (vs. Li/Li+). At this time, current density was 0.1 C, and initial charge and discharge efficiency (%) was a percentage of a first charge capacity relative to a first discharge capacity. As a result of identifying the initial charge and discharge efficiencies, the lithium secondary battery of Example 7 using core comprising silica having a fluorine-containing coating layer formed thereon exhibited charge and discharge efficiency which was increased to about 1% to about 3% in comparison to that of the lithium secondary battery of Comparative Example 1 using silica not coated with an organic polymer (see FIG. 1).

According to the foregoing results, it may be confirmed that charge and discharge efficiency of the secondary battery using the negative electrode active material coated with a fluorine-containing organic polymer coating layer of the present invention was significantly increased by decreasing the initial irreversible capacity of the negative electrode in contrast with a secondary battery using a typical negative electrode active material. Also, it may be understood that a surface modification method of the present invention through a deactivation/high-temperature treatment greatly strengthened characteristics of the negative electrode.

The invention claimed is:

1. A negative electrode active material slurry comprising a negative electrode active material, a binder, and a solvent, wherein the negative electrode active material comprises:
    (a) a core including one or more non-carbon-based materials selected from the group consisting of silicon, nickel, germanium, and titanium; and
    (b) a fluorine containing organic polymer coating layer formed uniformly on an entire surface of the core,
    wherein a thickness of the fluorine containing organic polymer coating layer is in a range of 50 nm to 100 nm;
    wherein the fluorine containing organic polymer coating layer comprises (a) an epoxy compound containing a fluorine component, (b) an acrylate-based compound containing a fluorine component, or (c) a silane-based compound containing a fluorine component;
    wherein (a) the epoxy compound containing a fluorine component comprises a compound expressed as the following Chemical Formula 1:

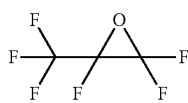

[Chemical Formula 1]

(b) the acrylate-based compound containing a fluorine component comprises a compound expressed as the following Chemical Formula 2:

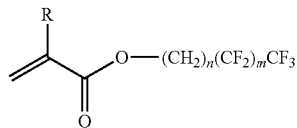

[Chemical Formula 2]

wherein R is a hydrogen or an alkyl group having carbon number of 1 to 2, n is an integer of 1 or 2, and m is 0 or an integer between 1 and 12; and
    (c) the silane-based compound containing a fluorine component comprises a compound expressed as the following Chemical Formula 3:

$$CF_3-(CF_2)_o-(CH_2)_p-SiCl_3$$  Chemical Formula 3 wherein o is an integer between 1 and 12, and p is an integer of 1 or 2.

2. The negative electrode active material slurry of claim 1, wherein the non-carbon-based material is a single phase of silicon, nickel, germanium, or titanium, or an alloy phase thereof.

3. The negative electrode active material slurry of claim 1, wherein the non-carbon-based material is in a form of a nanotube.

4. The negative electrode active material slurry of claim 1, wherein the organic polymer coating layer is formed of a polymer compound having a content of a fluorine component of 50 wt % or more.

5. The negative electrode active material slurry of claim 4, wherein the organic polymer coating layer is formed of a polymer compound having a content of a fluorine component ranging from 50 wt % to 95 wt %.

6. The negative electrode active material slurry of claim 1, wherein the acrylate-based compound containing a fluorine component is 2,2,2-trifluoroethyl methacrylate, 2-(perfluorohexyl)ethyl methacrylate, 2-(perfluorooctyl)ethyl methacrylate, 2-(perfluorodecyl)ethyl methacrylate, or 2-(perfluorooctyl)ethyl acrylate.

7. The negative electrode active material slurry of claim 1, wherein the silane-based compound containing a fluorine component is trichloro(1H,1H,2H,2H-perfluorooctyl)silane or perfluorodecyltrichlorosilane.

8. The negative electrode active material slurry of claim 1, wherein the fluorine containing organic polymer coating layer is formed of a single layer or a multilayer.

9. The negative electrode active material slurry of claim 1, wherein the fluorine containing organic polymer coating layer is formed by using a chemical vapor deposition method, a solvent evaporation method, a coprecipitation method, a precipitation method, a sol-gel method, an adsorption filtration method, or a sputtering method.

10. A lithium secondary battery comprising:
    (i) a positive electrode comprising a positive electrode active material;
    (ii) a negative electrode prepared by coating a current collector with the negative electrode active material slurry of claim 1;
    (iii) a separator; and
    (iv) an electrolyte,
    wherein the negative electrode includes a negative active material comprising:
    (a) a core including one or more non-carbon-based materials selected from the group consisting of silicon, nickel, germanium, and titanium; and
    (b) a fluorine containing organic polymer coating layer formed uniformly on an entire surface of the core, wherein a thickness of the fluorine containing organic polymer coating layer is in a range of 50 nm to 100 nm
wherein the fluorine containing organic polymer coating layer comprises (a) an epoxy compound containing a fluorine component, (b) an acrylate-based compound containing a fluorine component, or (c) a silane-based compound containing a fluorine component;
wherein (a) the epoxy compound containing a fluorine component comprises a compound expressed as the following Chemical Formula 1:

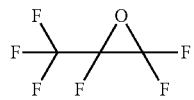
[Chemical Formula 1]

(b) the acrylate-based compound containing a fluorine component comprises a compound expressed as the following Chemical Formula 2:

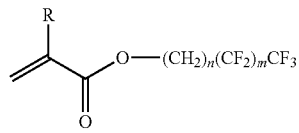
[Chemical Formula 2]

wherein R is a hydrogen or an alkyl group having carbon number of 1 to 2, n is an integer of 1 or 2, and m is 0 or an integer between 1 and 12; and
(c) the silane-based compound containing a fluorine component comprises a compound expressed as the following Chemical Formula 3:

$CF_3$—$(CF_2)_o$—$(CH_2)_p$—$SiCl_3$    Chemical Formula 3 wherein o is an integer between 1 and 12, and p is an integer of 1 or 2.

11. A negative electrode active material slurry comprising a negative electrode active material, a binder, and a solvent,
wherein the negative electrode active material comprises:
(a) a core including one or more non-carbon-based materials selected from the group consisting of silicon, nickel, germanium, and titanium; and
(b) a fluorine containing organic polymer coating layer formed uniformly on an entire surface of the core,
wherein a thickness of the fluorine containing organic polymer coating layer is in a range of 50 nm to 100 nm;
wherein the fluorine containing organic polymer coating layer comprises at least one of (b) an acrylate-based compound containing a fluorine component, or (c) a silane-based compound containing a fluorine component;
wherein
(b) the acrylate-based compound containing a fluorine component comprises a compound expressed as the following Chemical Formula 2:

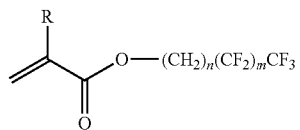
[Chemical Formula 2]

wherein R is a hydrogen or an alkyl group having carbon number of 1 to 2, n is an integer of 1 or 2, and m is 0 or an integer between 1 and 12, and
(c) the silane-based compound containing a fluorine component comprises a compound expressed as the following Chemical Formula 3:

$CF_3$—$(CF_2)_o$—$(CH_2)_p$—$SiCl_3$    Chemical Formula 3 wherein o is an integer between 1 and 12, and p is an integer of 1 or 2.

12. A lithium secondary battery comprising:
(i) a positive electrode comprising a positive electrode active material;
(ii) a negative electrode prepared by coating a current collector with the negative electrode active material slurry of claim 11;
(iii) a separator; and
(iv) an electrolyte,
wherein the negative electrode includes a negative active material comprises:
(a) a core including one or more non-carbon-based materials selected from the group consisting of silicon, nickel, germanium, and titanium; and
(b) a fluorine containing organic polymer coating layer formed uniformly on an entire surface of the core,
wherein a thickness of the fluorine containing organic polymer coating layer is in a range of 50 nm to 100 nm;
wherein the fluorine containing organic polymer coating layer comprises at least one of (b) an acrylate-based compound containing a fluorine component, or (c) a silane-based compound containing a fluorine component;
wherein
(b) the acrylate-based compound containing a fluorine component comprises a compound expressed as the following Chemical Formula 2:

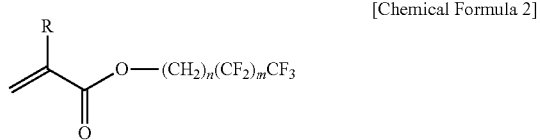
[Chemical Formula 2]

wherein R is a hydrogen or an alkyl group having carbon number of 1 to 2, n is an integer of 1 or 2, and m is 0 or an integer between 1 and 12, and
(c) the silane-based compound containing a fluorine component comprises a compound expressed as the following Chemical Formula 3:

$CF_3$—$(CF_2)_o$—$(CH_2)_p$—$SiCl_3$    Chemical Formula 3 wherein o is an integer between 1 and 12, and p is an integer of 1 or 2.

* * * * *